United States Patent Office 3,507,904
Patented Apr. 21, 1970

3,507,904
NOVEL TETRAHYDROPHTHALAMIC ACIDS
AND DERIVATIVES THEREOF
Herbert Schwartz, Chimes Terrace, Vineland, N.J.,
08360, and Joseph B. Skaptason, 12700 Prospect
Ave., Rte. 30, Kansas City, Mo. 64146
No Drawing. Filed Apr. 1, 1966, Ser. No. 539,266
Int. Cl. C07c 79/46, 101/00
U.S. Cl. 260—471                                    10 Claims

ABSTRACT OF THE DISCLOSURE

Tetrahydrophthalamic compounds selected from the group consisting of compounds of the formula

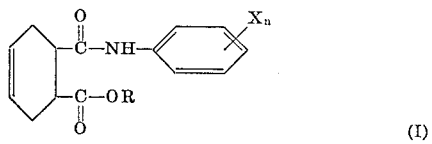

(I)

wherein R is selected from the group consisting of hydrogen, $NH_4$, alkali metals, alkaline earth metals, alkyl ammonium, and lower alkyl of 1 to 7 carbon atoms, X is at least one member selected from the group consisting of halogen, lower alkyl, halogenated lower alkyl and sulfamoyl and $n$ is an integer from 1 to 5 and imides of the said compounds. The invention also relates to novel herbicidal compositions and to a novel method of regulating the growth of plants.

---

The novel tetrahydrophthalamic acids and their derivatives possess interesting biological activities, particularly post-emergence herbicidal activity, mildewcidal, fungicidal and insecticidal activity.

OBJECTS OF THE INVENTION

It is an object of the invention to provide novel tetrahydrophthalanilic acid compounds of Formula I.

It is another object of the invention to provide novel pesticidal compositions.

These and other objects and advantages of the invention will become obvious from the following detailed description.

THE INVENTION

The novel compounds of the invention are tetrahydrophthalamic acids and their salts and esters of the formula

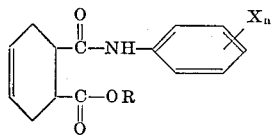

wherein R is selected from the group consisting of hydrogen, —$NH_4$, alkali metals, alkaline earth metals, alkyl ammonium and lower alkyl of 1 to 7 carbon atoms, $n$ is an integer from 1 to 5, preferably 1 to 3, and X is at least one member selected from the group consisting of halogen, lower alkyl, halogenated lower alkyl and sulfamoyl and the imides of the said tetrahydrophthalamic acids.

The novel compounds of the invention may be made by known procedures. The tetrahydrophthalanilic acids may be made by reacting the desired substituted aniline with tetrahydrophthalic anhydride which is the Diels-Alder adduct of butadiene and maleic anhydride in an inert organic solvent. The salts of the said acids may be prepared by treating the acid with aqueous sodium bi-carbonate to form an aqueous solution of the sodium salt of the acid which can be neutralized with a base of the desired anion. The esters of the tetrahydrophthalanilic acids may be made by reacting the acid with the desired alcohol such as methanol, butanol, etc., in the presence of phosphorous pentoxide or sulfuric acid at room temperature. The corresponding imides can be prepared by thermal decomposition of the esters or by dehydrating the said acids.

The substituted anilines used to prepare the novel compounds can be halogenated anilines such as 3-bromoaniline, 3 - iodoaniline, 3 - chloroaniline, 3,4-dichloroaniline, 2,4 - dichloroaniline, 4 - fluoroaniline; alkylated anlines such as 3-methylaniline, 4-butylaniline, 4-methylaniline, etc.; halogenated lower alkyl anilines such as 3-trifluoromethyaniline, 4 - chloroethylaniline, 4 - chloromethylaniline, etc.; sulfamoylanilines such as 4-sulfamoylaniline, etc.; and anilines where the substituents are different, such as 3-chloro - 4 - methylaniline, 2-methyl-4-bromoaniline, etc.

The novel compounds of the invention are excellent herbicides, mildewcides, fungicides and insecticides and may be formulated in various forms such as dusting preparations, solutions, emulsions, dispersions, aerosol sprays, etc.; depending upon the desired use.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes or tetrahydronaphthalene, if desired, with the use of xylene mixtures, cyclohexanols, ketones, or chlorinated hydrocarbons, such as tetrachlorethane, trichlorethylene or trior tetrachlorobenzenes.

Aqueous preparations suitable for application can be prepared by the addition of water to emulsion concentrates, pastes or wettable powders. As emulsifying or dispersing agents, there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethyleneoxide, or of soya bean fatty acid with 30 molecular proportions of ethyleneoxide or of commercial oleylamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or of a mixture of these acids, or the sodium salt of petroleum-sulfonic acid. As cation-active dispersing agents, there may be used quaternary ammonium compounds, such as cetyl-pyridinium bromide or di-(hydroxyethyl)-benzyl-dodecylammonium chloride.

For making dusting or scattering preparations, there may be used as solid carriers talcum, kaolin, bentonite, calcium carbonate or calcium phosphate or carbon, cork meal or wood meal, or other materials of vegetable origin. The various preparations can be rendered more suitable for the various ways in which they are to be used by the known addition of substances which improve the dispersion, adhesiveness, resistance to rain or penetration capacity of the compositions. As such substances, there may be mentioned fatty acids, resins glue, casein, or for example, alginates or the like.

For herbicidal use, the compounds of the invention may be used alone or in combination with other known herbicides such as dipyridylium salts such as 1,1'-ethylene-2,2'-bipyridylium dibromide (Diquat) and 1,1'-dimethyl- 4,4'-bipyridylium di(methyl sulfate) (Paraquat); alkali metal and alkaline earth metal nitrate salts, such as sodium nitrate, calcium nitrate, etc.; herbicidal arsenical compounds such as mono-lower alkane-arsonic acids and lower dialkylarsinic acids such a methanearsonic acid, propanearsonic acid, dibutylarsinic acid, dipropylarsinic acid, cacodylic acid, (hydroxydimethylarsine oxide), etc., and their alkali metal and alkaline earth metal salts such as monosodium methane arsonate, (MSMA), disodium methane arsonate, (DSMA), calcium hydrogen methanearsonate, and amine salts of the said arsonic acids where the amine is ethanolamine, diethanolamine, triethanolamine, isopropylamine, tri-isopropanolamine, mixtures of alkyl-amines having 8 to 14 carbon atoms, etc.

In the following examples, there are described several preferred embodiments to illustrate the invention. However, it should be understood that the invention is not intended to be limited to the specific embodiments.

EXAMPLE I

Preparation of tetrahydrophthalanilic acids

A hot solution of 10 g. of tetrahydrophthalic anhydride, (Diels-Alder adduct of butadiene and maleic anhydride), was added with stirring to 10.6 g. of 3-trifluoromethylaniline in 100 ml. of benzene. After the two solutions had been thoroughly admixed, the reaction mixture was refluxed with stirring for one hour after which the solvent was removed by distillation. The residue was washed with aqueous hydrochloric acid to remove any unreacted aniline and then with water until the wash waters were neutral to obtain 20.5 gm. of crude product. The product was dried and recrystallized from aqueous methanol to obtain colorless needles of 3'-trifluoromethyltetrahydrophthalanilic acid having a melting point of 149 to 149.5° C. and a nitrogen content of 4.84%, (theoretical, 4.62%).

Using the same procedure, the following acids of Formula II were prepared:

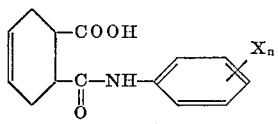

(II)

TABLE I

| $X_n$ | Melting point, °C. | Percent N Calculated | Found |
|---|---|---|---|
| 3'-chloro | 131.5–132.0 | 5.01 | 5.19 |
| 3',4'-dichloro | 148–149 | 4.46 | 4.45 |
| 2',4'-dichloro | 128–129 | 4.46 | 4.41 |
| 3'-chloro-4'-methyl | 174.5–175.5 | 4.76 | 5.16 |
| 3'-bromo | 143–145 | 4.32 | 4.12 |

The salts of the said acids were prepared by dissolving the acid in an aqueous solution of sodium bicarbonate to form an aqueous solution of the sodium salt of the acid. The alkali metal, alkaline earth metal and alkyl ammonium salts of the acids can be prepared from the said aqueous solution by standard procedures for the neutralization of any organic acid. Examples of alkyl ammonium ions are octylammonium, dibutylammonium, triethylammonium, tetramethylammonium, etc.

EXAMPLE II

Preparation of esters of tetrahydrophthalanilic acids 2 g. of phosphorous pentoxide were added to 250 cc. of absolute methanol with cooling and then 2 g. of 2',4'-dichlorotetrahydrophthalanilic acid (prepared as in Example I), were added and the resulting suspension was agitated at room temperature until all of the acid had dissolved. The reaction mixture was then neutralized with concentrated aqueous sodium bicarbonate and extracted with ether. The ether extract was dried over anhydrous sodium sulfate and the ether was evaporated to leave a residue of the methyl ester of 2',4'-dichlorotetrahydrophthalanilic acid. The said product was recrystallized from petroleum ether to obtain the said ester in the form of short needles which decomposed at 96 to 98° C. and contained 4.27% nitrogen (theoretical, 4.27%).

Using the same procedure, the methyl ester of 3',4'-dichlorotetrahydrophthalanilic acid which decomposed at 96 to 98° C. and contained 4.36% nitrogen (theoretical, 4.27%), was prepared.

EXAMPLE III

Preparation of 4'-sulfamoyltetrahydrophthalanil

A mixture of 1.5 g. of cis-$\Delta^4$-tetrahydrophthalic anhydride and 1.7 gm. of p-sulfanilamide were fused and then cooled to a solid. The said solid was recrystallized from a 1:1 mixture of butanol and pentanol to obtain 4'-sulfamoyltetrahydrophthalanil in the form of tan platelets having a melting point of 264° C. A nitrogen determination found 9.04% (theoretical, 9.15%).

EXAMPLE IV

Preparation of tetrahydrophthalanils 5 g. of acetyl chloride were added to 8 g. of dry, crude 3'-bromotetrahydrophthalanilic acid and the mixture was gently refluxed for one hour after which the excess acetyl chloride was removed by evaporation in vacuo. A residue of 6.3 g. of crude 3'-bromotetrahydrophthalanil was obtained which upon recrystallization from aqueous methanol gave 5.2 g. of the said product in the form of colorless needles melting at 138.5 to 140° C. and containing a nitrogen content of 4.55% (theoretical, 4.58%).

Using the same procedure, the following anils of Formula III were prepared:

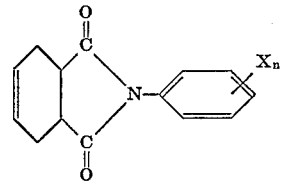

(III)

TABLE II

| $X_n$ | Melting point, °C. | Percent Calculated | Found |
|---|---|---|---|
| 3'-chloro | 135 | 5.36 | 5.38 |
| 4'-sulfamoyl | 264 | 9.15 | 9.18 |
| 3',4'-dichloro | 148 | 4.73 | 4.71 |
| 2',4'-dichloro | 104–105 | 4.73 | 4.81 |
| 3'-chloro-4'-methyl | 165–167 | 5.08 | 5.06 |
| 3'-trifluoromethyl | 145–146 | 4.74 | 4.72 |

EXAMPLE V

To determine the fungicidal and bactericidal activity of the compounds of Formula I, the compounds were measured into 10 ml. test tubes containing sufficient nutrient broth to give final concentration of 50, 500 and 5000 p.p.m. of the compounds. 1 ml. of uniformly dried and prepared soil from a food source for the mixture of organisms originating from the soil was added to each test tube and the tubes were allowed to stand for several days. The extent of growth of fungi and bacteria which is evidenced by turbidity in the tubes was determined periodically with a final reading after 3 days on a scale of 0 (complete control) to 5 (no control). The results are summarized in Table III.

TABLE III

| Compound | Dosage in p.p.m. | Degree of control |
|---|---|---|
| 2',4'-dichlorotetrahydrophthalanilic acid | 5,000 | 0 |
|  | 500 | 5 |
|  | 50 | 5 |
| 3',4'-dichlorotetrahydrophthalanilic acid | 5,000 | 0 |
|  | 500 | 0.5 |
|  | 50 | 3 |
| Spergon | 5,000 | 2 |
|  | 500 | 3 |
|  | 50 | 5 |

Table III shows that the tetrahydrophthalanilic acids of the invention possess fungicidal and bactericidal activity greater than that of the commercial product, Spergon.

EXAMPLE VI

Potted bean plants were sprayed with an acetone solution containing 100 p.p.m. of Triton X-100 as an emulsifier and 1000 p.p.m. of methyl 2',4'-dichlorotetrahydrophthalanilate and the plants were then subjected to heavy infetcion of Early Blight and Bean Mildrew. As compared to controls the treated plants were 100% protected against Early Blight and 75% protected against Bean Mildew.

EXAMPLE VII

2',4' - dichlorotetrahydrophthalanilic acid was applied as a thin film of acetone containing 1000 p.p.m. of the said acid to the walls of a 25 mm. x 200 mm. test tube, and ten flies (Drosophilia melanogaster), were released into the test tube which was then stoppered with absorbent cotton. The flies had sufficient food for 3 days. At the end of 48 hours, it was found that 100% of the flies had died.

The compounds were prepared as 10% emulsion concentrates in two specific types of solvents as follows:

Formula F
   Compound—10% by weight
   Triton X-161—10% by weight
   Solvent F—80% by volume Formula 50 M
   Compound—10% by weight
   Triton X-161—10% by weight
   Solvent 50 M—80% by volume Triton X-161 is a blend of anionic and nonionic alkyl aryl polyether alcohols and organic sulfonates. Solvent F is a 50:50 by volume mixture of diethylene glycol monobutyl ether acetate and Velsicol AR 50 (methylated naphthalenes). Solvent 50 M is a 20:80 by volume mixture of ethyl acetate and Velsicol AR 50. Before application, the concentrates were diluted to a concentration of 2000 p.p.m. of the compound being tested.

The seven crops to be tested had been planted in flats 12 to 14 days before the tests and were well established seedlings. The plants were sprayed by a precision turntable technique in which 30 ml. of the spray solution (about 2.5 pounds per acre) was applied to each flat containing the seven crops. The plants were then kept under constant daily surveillance for a period of 7 to 14 days. The final phytotoxicity data were recorded at the end of 14 days and the plants were scored for phototoxicity ratings on a scale from 0 (no injury to plants) to 10 (all the plants were killed). The results of the tests are summarized in Table V.

TABLE V

| Compound | Solvent | Phytotoxicity rating | | | | | | |
|---|---|---|---|---|---|---|---|---|
|  |  | Beets | Tomato | Radish | Flax | Johnson Grass | Oats | Wheat |
| 2',4'-dichlorotetrahydrophthalanilic acid | F | 0 | 4 | 9 | 9 | 2 | 0 | 0 |
|  | 50 M | 0 | 6 | 8 | 9 | 4 | 4 | 0 |
| 2',3'-dichlorotetrahydrophthalanil | F | 0 | 5 | 5 | 10 | 9 | 8 | 4 |
|  | 50 M | 5 | 9 | 9 | 10 | 9 | 9 | 5 |
| Methyl 2',4'-dichlorotetrahydrophthalanilate | F | 0 | 8 | 8 | 10 | 10 | 9 | 2 |
|  | 50 M | 4 | 9 | 9 | 10 | 9 | 9 | 2 |
| Methyl 3',4'-dichlorotetrahydrophthalanilate | F | 7 | 8 | 10 | 10 | Rye 10 | 9 | 9 |
|  | 50 M | 7 | 10 | 10 | 10 | 9 | 4 | 9 |

EXAMPLE VIII

The insecticidal activity on the confused flour beetle (Tribolium confusum) was determined by placing the beetles and larvae in 9.6 cm. petri dishes to which had been previously added one milliliter of acetone containing 5000 p.p.m. of the test compounds, and the acetone allowed to evaporate. After three days, the percent of mortality was determined and the results are summarized in Table IV.

TABLE IV

| Compound | Percent mortality after 3 days | |
|---|---|---|
|  | Adults | Larvae |
| 4'-sulfamoyltetrahydrophthalanil | 85 | 100 |
| 3'-4'-dichlorotetrahydrophthalanil | 100 | 100 |
| Chlordane | 35 |  |

Table IV shows that the tetrahydrophthalanils of the invention are more effective against the confused flour beetle than the commercial insecticide, Chlordane.

EXAMPLE IX

General post-emergence herbicidal activity

To demonstrate the general herbicidal activity of the tetrahydrophthalamic compounds of the invention, compounds of the invention were applied to seven different plants according to the following procedure.

Table V shows the herbicidal activity of the compounds of the invention. Methyl 2',4'-dichlorotetrahydrophthalanilate is particularly useful as a herbicide for the control of wild oats in wheat fields.

Various modifications of the products and compositions of this invention may be made without departing from the spirit or scope thereof, and it is to be understood that the invention is to be limited only as defined in the appended claims.

What is claimed is:

1. A tetrahydrophthalamic compound of the formula:

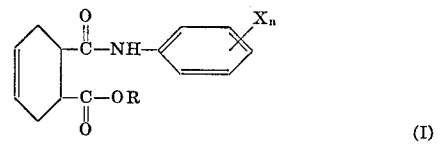

(I)

wherein R is selected from the group consisting of hydrogen, $NH_4$, alkali metals, alkaline earth metals, alkyl ammonium and lower alkyl of 1 to 7 carbon atoms, X is at least one member selected from the group consisting of halogen, lower alkyl, halogenated lower alkyl and sulfamoyl and n is an integer from 1 to 5.

2. A compound of claim 1, wherein R is hydrogen, n is 1 and X is chlorine in the 3 position.

3. A compound of claim 1 wherein R is hydrogen, n is 1, and X is $CF_3$— in the 3 position.

4. A compound of claim 1 wherein R is hydrogen, $n$ is 2 and the X's are chlorine in the 3 and 4 positions.

5. A compound of claim 1 wherein R is hydrogen, $n$ is 2 and the X's are chlorine in the 2 and 4 positions.

6. A compound of claim 1 wherein R is hydrogen, $n$ is 2 and one X is a chlorine in the 3 position and the other X is $CH_3$ in the 4 position.

7. A compound of claim 1 wherein R is hydrogen, $n$ is 1 and X is bromine in the 3 position.

8. A compound of claim 1 wherein R is hydrogen, $n$ is 1 and X is sulfamoyl in the 4 position.

9. A compound of claim 1 wherein R is $CH_3$, $n$ is 2 and the X's are chlorine in the 2 and 4 positions.

10. A compound of claim 1 wherein R is $CH_3$—, $n$ is 2 and the X's are chlorine in the 3 and 4 positions.

References Cited

UNITED STATES PATENTS 2,556,665   6/1951   Smith et al. _____ 260—518
2,821,467   1/1958   Lewis _____ 260—518

LORRAINE A. WEINBERGER, Primary Examiner

L. A. THAXTON, Assistant Examiner

U.S. Cl. X.R.

71—103, 111, 114; 260—326, 470, 518, 501.11; 424—274, 309, 319